UNITED STATES PATENT OFFICE.

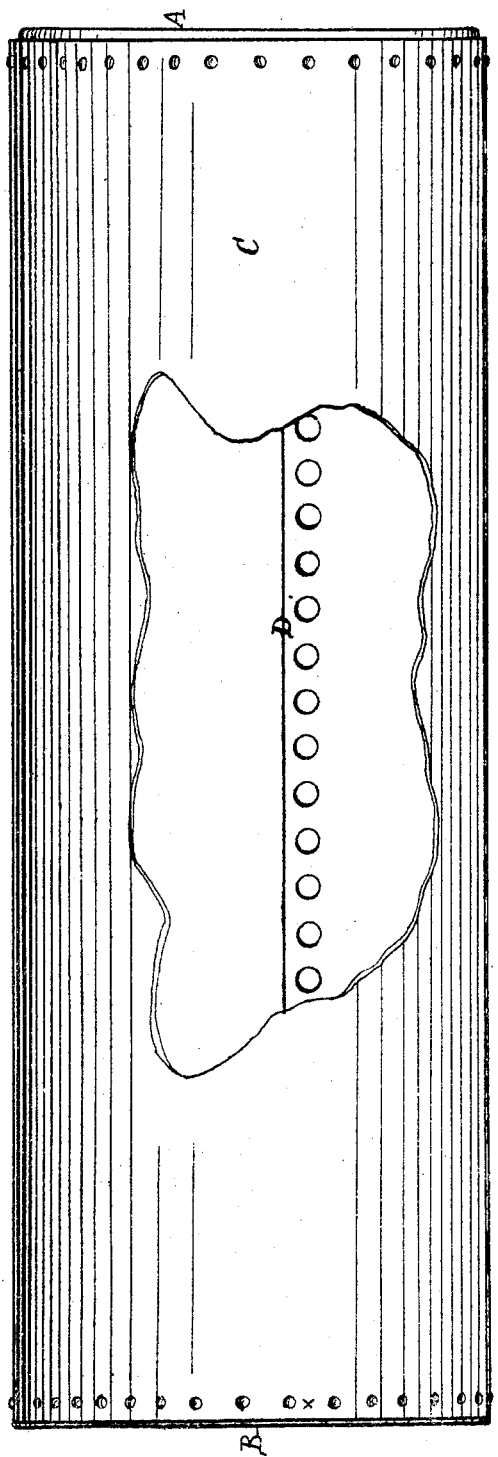

WILLIAM B. SCAIFE, OF PITTSBURG, PENNSYLVANIA.

IMPROVEMENT IN STEAM-GENERATORS FOR KITCHEN AND OTHER PURPOSES.

Specification forming part of Letters Patent No. 94,779, dated September 14, 1869.

*To all whom it may concern:*

Be it known that I, WILLIAM B. SCAIFE, of Pittsburg, in the county of Allegheny and State of Pennsylvania, have invented a new and useful Improvement in Circulating-Water Steam-Generators for Kitchens or other Places; and I do hereby declare that the following is a full, clear, and exact description thereof, reference being had to the accompanying drawings, and to the letters of reference marked thereon.

The nature of my invention consists in the construction, as hereinafter described, of a circulating-water steam-generator for kitchens and other purposes.

To enable others skilled in the art to make and use my invention, I will proceed to describe its construction and operation.

The accompanying drawings, which form part of my specification, represent a side view of an ordinary kitchen circulating-water steam-generator, the heads A and B of which are fitted into and riveted, as indicated at $x$, to the cylinder or body C, and the seam D, which runs lengthwise of the body, is also riveted, as indicated at $x'$.

The fitting of the heads A and B into the bore of the cylinder or body C and the manner of making the side seam D and the riveting together of the several parts are all done in any known manner and by any known means, and the size and form of the boiler may be varied to suit the desire of the manufacturer.

The heads or ends A and B are formed by means of suitable dies, and the sheet or sheets of metal for forming the cylinder or body C being made of proper size, marked off, punched, and it or them bent to the desired form, the seam D is then riveted, after which the seam D is brazed, in the manner practiced by skillful braziers. After the seam D has been properly riveted and brazed, the heads A and B are properly adjusted in the bore of the cylinder or body C, as shown in the accompanying drawings. The heads are then marked in the usual manner for punching, after which they are removed, punched, replaced in the cylinder or body C, and riveted in position, after which the seams around the heads are brazed.

The advantage of brazing the seams or joints, in combination with the riveting of said seams or joints, of kitchen circulating-water steam-generators consists in avoiding all leakage at the joints, which leakage is a very great objection to their use.

I am aware that riveting and soldering the joints of vessels made of sheet metal is well known. I do not claim such method of securing seams and joints in vessels, for the solder will melt when subjected to a degree of heat much below a "cherry-red heat;" but seams and joints brazed as herein described are much stronger, and will not melt until the vessels have been subjected to a degree of heat which is above a cherry-red heat.

Having thus described the nature, construction, and operation of my improvement, what I claim as of my invention is—

The construction of a kitchen circulating-water steam-generator, as hereinbefore described.

W. B. SCAIFE.

Witnesses:
   A. C. JOHNSTON,
   GEO. H. THOMAS.